(12) United States Patent
Donauer et al.

(10) Patent No.: US 10,940,418 B2
(45) Date of Patent: Mar. 9, 2021

(54) ROUND FILTER ELEMENT HAVING A LONGITUDINALLY EXTENDING CROSS-SECTIONAL SHAPE

(71) Applicant: MANN+HUMMEL GmbH, Ludwigsburg (DE)

(72) Inventors: Nadine Donauer, Fellbach (DE); Pascal Neef, Leonberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 1 day.

(21) Appl. No.: 16/417,730

(22) Filed: May 21, 2019

(65) Prior Publication Data
US 2019/0270045 A1 Sep. 5, 2019

Related U.S. Application Data

(63) Continuation of application No. PCT/EP2017/076945, filed on Oct. 23, 2017.

(30) Foreign Application Priority Data

Nov. 22, 2016 (DE) .......................... 102016013844.0

(51) Int. Cl.
*B01D 46/24* (2006.01)

(52) U.S. Cl.
CPC ..... *B01D 46/2403* (2013.01); *B01D 46/2414* (2013.01); *B01D 2275/201* (2013.01); *B01D 2275/206* (2013.01); *B01D 2275/208* (2013.01)

(58) Field of Classification Search
CPC ............ B01D 46/2403; B01D 46/2414; B01D 2275/201; B01D 2275/206; B01D 2275/208

USPC ..... 55/385.3, 498, 502, 521, 529; 123/198 E
See application file for complete search history.

(56) References Cited

U.S. PATENT DOCUMENTS

| 2,190,683 | A | 2/1940 | Schaaf et al. |
| 3,550,423 | A | 12/1970 | Wood |
| 5,104,534 | A | 4/1992 | Branchcomb |
| 5,174,896 | A | 12/1992 | Harms, II |

(Continued)

FOREIGN PATENT DOCUMENTS

| DE | 202010009989 U1 | 2/2012 |
| DE | 102011011595 A1 | 8/2012 |

(Continued)

*Primary Examiner* — Minh Chau T Pham
(74) *Attorney, Agent, or Firm* — James Hasselbeck

(57) ABSTRACT

A round filter element has a filter medium body with a wall to be flowed through by a fluid to be purified radially relative to a longitudinal axis of the filter medium body. The filter medium body has a longitudinally extending cross-sectional shape in a direction transverse to the longitudinal axis. The filter medium body has a first end face and a second end that are axially oppositely positioned relative to each other in a direction along the longitudinal axis of the filter medium body. A first end disk and a second end disk are arranged at the first and second end faces, respectively, and have the same cross-sectional shape. The filter medium body has a twist by being twisted about the longitudinal axis such that the axially oppositely positioned first and second end faces of the filter medium body are angularly displaced relative to each other.

14 Claims, 2 Drawing Sheets

(56) References Cited

U.S. PATENT DOCUMENTS

| | | | |
|---|---|---|---|
| 2009/0134087 A1* | 5/2009 | Hawkins | B01D 35/30 |
| | | | 210/438 |
| 2012/0160755 A1* | 6/2012 | LaCroix | B01D 29/21 |
| | | | 210/232 |
| 2012/0228211 A1* | 9/2012 | Hawkins | B01D 35/30 |
| | | | 210/348 |
| 2013/0327005 A1* | 12/2013 | Menssen | B01D 46/2411 |
| | | | 55/493 |
| 2014/0047808 A1* | 2/2014 | Menssen | B01D 46/2411 |
| | | | 55/502 |
| 2014/0144111 A1* | 5/2014 | Campbell | B01D 46/523 |
| | | | 55/482 |
| 2016/0144310 A1* | 5/2016 | Movia | B01D 46/2411 |
| | | | 55/478 |
| 2017/0096971 A1* | 4/2017 | Kaufmann | B01D 46/0023 |
| 2018/0339254 A1* | 11/2018 | Kaufmann | F02M 35/0245 |
| 2019/0063380 A1* | 2/2019 | Dirnberger | F02M 35/0203 |
| 2019/0344207 A1* | 11/2019 | Knight | B01D 35/005 |
| 2020/0061512 A1* | 2/2020 | Holzmann | F02M 35/02475 |

FOREIGN PATENT DOCUMENTS

| | | |
|---|---|---|
| DE | 202012102279 U1 | 9/2013 |
| EP | 1523379 B1 | 4/2005 |
| FR | 1288170 A | 3/1962 |
| GB | 534385 A | 3/1941 |
| JP | S63209712 A | 8/1988 |
| WO | 2014194275 A2 | 12/2014 |

\* cited by examiner

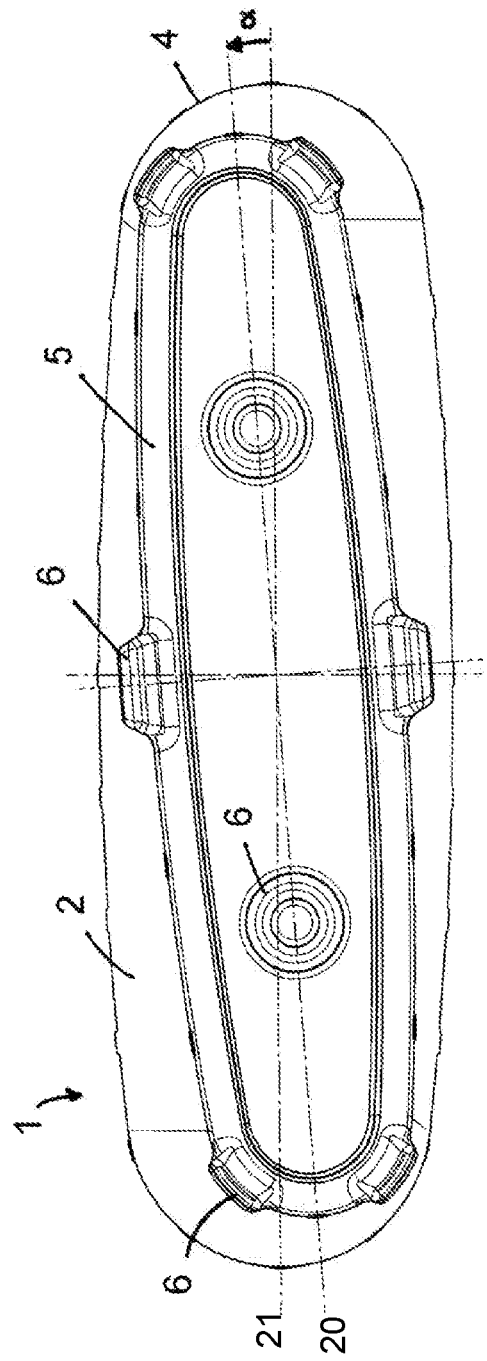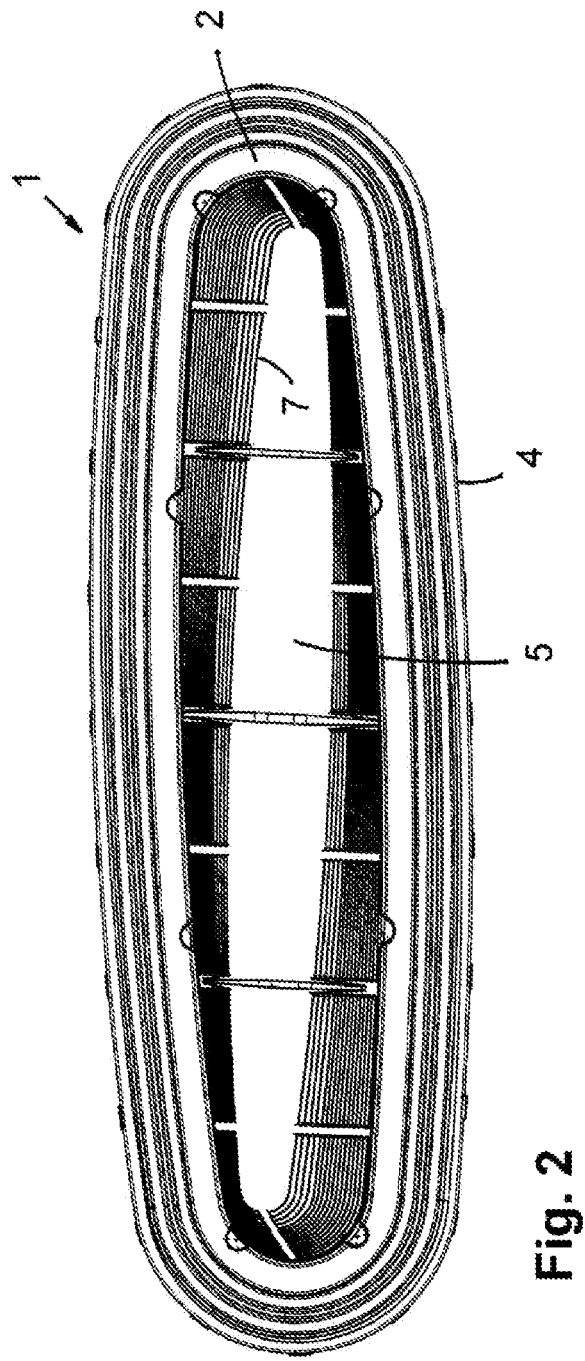

ROUND FILTER ELEMENT HAVING A LONGITUDINALLY EXTENDING CROSS-SECTIONAL SHAPE

CROSS-REFERENCE TO RELATED APPLICATIONS

This application is a continuation application of international application No. PCT/EP2017/076945 having an international filing date of 23 Oct. 2017 and designating the United States, the international application claiming a priority date of 22 Nov. 2016 based on prior filed German patent application No. 10 2016 013 844.0, the entire contents of the aforesaid international application and the aforesaid German patent application being incorporated herein by reference.

BACKGROUND OF THE INVENTION

The invention concerns a round filter element, in particular for gas filtration, for example, for an air filter, with a filter medium body whose wall can be flowed through by the fluid to be purified in radial direction relative to the longitudinal axis of the filter medium body, wherein the filter medium body comprises a longitudinally extending cross-sectional shape, wherein at the axially oppositely positioned end faces of the filter medium body an end disk is arranged, respectively, and the two end disks comprise the same cross-sectional shape.

DE 10 2011 011 595 A1 discloses a filter element for air filtration whose annularly extending filter medium body comprises a longitudinally extending cross-sectional shape with semicircular narrow sides and concavely inwardly oriented longitudinal sides. The filter medium body encloses an inwardly positioned flow space into which the raw fluid to be purified is introduced axially; subsequently, the filter medium body is flowed through radially from the interior to the exterior by the fluid. The filter medium body comprises across its axial height a constant, unchanging cross-sectional shape.

SUMMARY OF THE INVENTION

The invention has the object to configure a round filter element with longitudinally extending cross-sectional shape with simple constructive measures such that, while providing a high filtration performance, an adaptation to different installation situations can be realized with minimal modifying expenditure.

This object is solved according to the invention in that the filter medium body, by twisting about its longitudinal axis, is twisted in such a way that the axially oppositely positioned end faces of the filter medium body are angularly displaced relative to each other.

The dependent claims provide expedient further embodiments.

The round filter element according to the invention is preferably employed for gas filtration, for example for an air filter, in particular in the intake manifold of an internal combustion engine of a vehicle. The filter element comprises an annularly closed filter medium body whose wall is flowed through by the fluid to be purified in radial direction, relative to the longitudinal axis of the filter element. The filter medium body encloses an inwardly positioned flow space which is delimited by the inner wall of the filter medium body. The filter medium body is preferably flowed through radially from the exterior to the interior by the fluid to be purified so that the inner wall of the filter medium body forms the clean side. However, flow through the filter medium body in opposite direction, i.e., radially from the interior to the exterior, is conceivable also.

The filter medium body comprises a longitudinally extending cross-sectional shape which, for example, is embodied oval or ovalized or has semicircular narrow sides and parallel longitudinal sides or semicircular narrow sides and convexly or concavely curved longitudinal sides. At the axially oppositely positioned end faces of the filter medium body, an end disk is arranged, respectively, that closes off the filter medium body axially flow-tightly. Advantageously, one end disk is of a closed configuration and the oppositely positioned second end disk is of an annular open configuration in order to enable an axial flow path between the environment and the interior within the filter medium body.

The filter medium body comprises a twist about its longitudinal axis. Accordingly, the oppositely positioned end faces of the filter medium body with the end disks arranged thereat are rotated relative to each other so that an adaptation to different installation space conditions is possible. Due to the configuration with non-rotational symmetry of the filter medium body and of the end faces of the filter medium body, the end faces are not congruent to each other and enable, for example, an insertion into a correspondingly shaped filter housing.

Twisting of the filter medium body about the longitudinal axis is realized advantageously uniformly across the axial height of the filter medium body. Accordingly, the twisting per height section is equal across the entire height of the filter medium body.

In an alternative embodiment, different height sections of the filter medium body have a different degree of twisting wherein optionally one or several height sections may also be embodied without twisting.

The entire twisting of the filter medium body about the longitudinal axis amounts to, for example, at least 1° or at least 2° and maximally 20° or maximally 10°. The twisting is in a range of magnitude of 3°, 4°, or 5°, for example.

According to a further expedient embodiment, the oppositely positioned end disks are arranged parallel to each other. The twisting of the filter medium body is carried out in such a way that the axially oppositely positioned end faces and the end disks arranged thereat experience only a relative rotation about the longitudinal axis relative to each other but, beyond that, no further tilting or pivot movement.

According to yet another expedient embodiment, a support grid is integrated in the filter element and is preferably manufactured of plastic material. The support grid is located preferably at the inner wall of the filter medium body and lines the interior which is enclosed by the filter medium body. The support grid contributes to stabilization of the filter medium body. Advantageously, the support grid is provided also with the same twisting as the filter medium body. The support grid ensures moreover that the twisting of the filter medium body is permanently maintained. Producing the twisting of the filter medium body is realized, for example, directly by an injection molding process, in particular with a thermoplastic material, or, for example, in that the support grid by heating is transferred into a plastic state, twisting of the filter medium body and of the support grid is subsequently performed, and the filter medium body, in the twisted state, is stabilized until the support grid material has cooled down and hardened.

In any case, it is expedient that the filter medium body maintains the twisting permanently. This is realized, as described above, preferably by means of a support grid that is also twisted but can optionally also be provided in other ways, for example, by individual support stays or by glue beads at the inner or outer side of the filter medium body, or similar measures.

According to yet another expedient embodiment, the filter medium body has a tapering cross-sectional shape in axial direction so that the outer circumference of the filter medium body in the region of an end face with end disk arranged thereat is of a different size in comparison to the outer circumference in the region of the oppositely positioned end face with end disk arranged thereat. The tapering is realized preferably uniformly across the axial height of the filter medium body so that the filter medium body is conically embodied.

According to an advantageous embodiment, the filter medium body is twisted about its longitudinal axis maximally so far that the outer contour of the smaller end disk is positioned within the envelope of the larger end disk. Correspondingly, the smaller end disk, in the projection onto the larger end disk, is lying within the outer contour of the larger end disk. In case of a strongly conically extending filter medium body, this embodiment permits larger twisting angles between the end disks compared to less strongly conically embodied filter medium bodies.

In an alternative embodiment, larger twisting angles between the end faces or end disks are possible also so that the outer contour of the smaller end disks in sections is lying outside of the envelope of the larger end disk.

According to yet another expedient embodiment, the smaller end disk is embodied closed and the larger end disk is embodied open. Through the open larger end disk, the fluid flow between the environment and the interior within the filter medium body is realized.

According to yet another expedient embodiment, the width of the cross-sectional shape of the filter medium body in the region of the larger end face is by at least 25% larger than the width of the cross-sectional shape in the region of the smaller end face. Moreover, it can be expedient that the axial height of the filter medium body is at least twice as large as the width of the cross-sectional shape of the filter medium body in the region of the smaller end face or optionally also in the region of the larger end face. According to yet another advantageous embodiment, the length of the cross-sectional shape of the filter medium body amounts to at least three times the width of the cross-sectional shape of the filter medium body.

According to yet another expedient embodiment, the oppositely positioned end faces as well as the end disks at the end faces have the same cross-sectional shape wherein, in case of a cross section that tapers across the axial height, the surface area is different but the cross-sectional shapes exhibit the same configuration.

The invention concerns moreover a filter device with an afore described filter element and with a filter housing for receiving the filter element.

BRIEF DESCRIPTION OF THE DRAWINGS

Further advantages and expedient embodiments can be taken from the additional claims, the figure description, and the drawings.

FIG. 1 shows a view of the smaller end face of a filter element with an axially tapering filter medium body wherein the oppositely positioned end faces are embodied twisted relative to each other.

FIG. 2 is a view of the oppositely positioned end face of the filter element according to FIG. 1.

In the figures, same components are provided with same reference characters.

DESCRIPTION OF PREFERRED EMBODIMENTS

Figure 3:
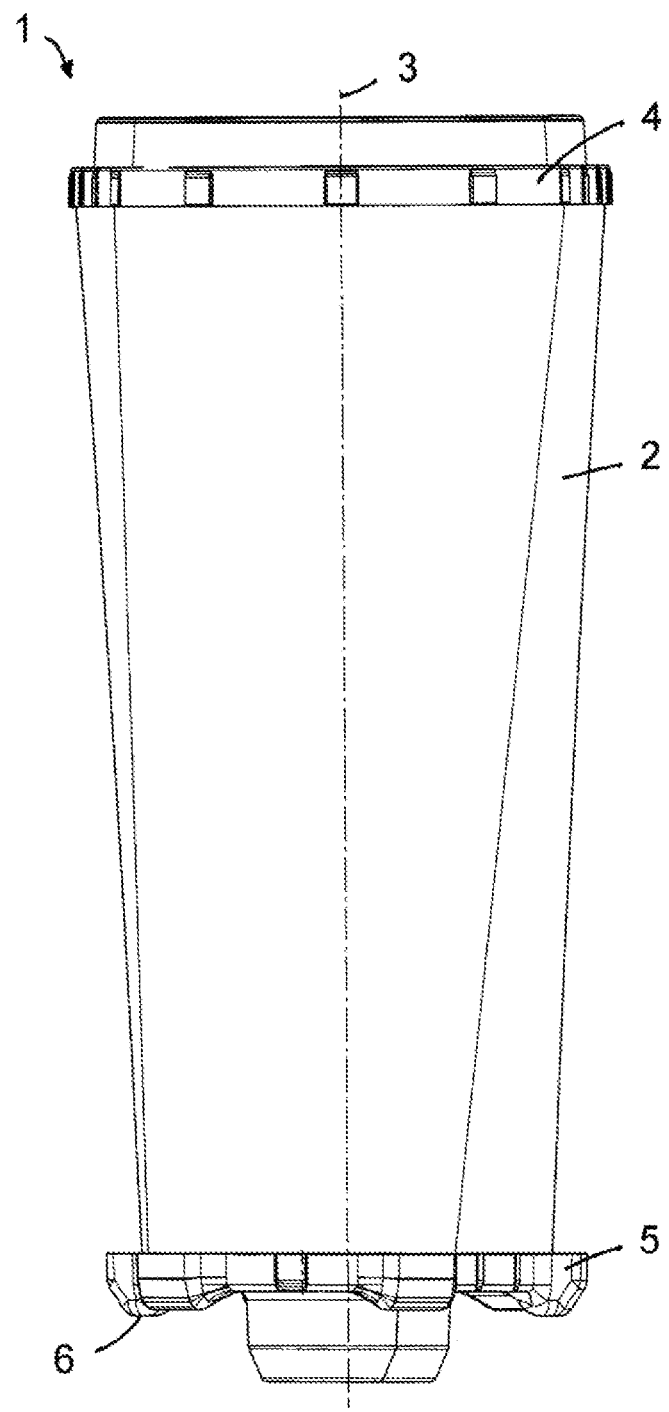
FIG. 3 shows a side view of the filter element.

FIGS. 1 to 3 show respectively a round filter element 1 of an air filter which can be used for filtration of combustion air to be supplied to an internal combustion engine. The round filter element 1 comprises a circumferentially closed filter medium body 2 of a filter material, for example, a folded filter paper, and encloses radially an interior through which the purified clean air can be axially discharged. Relative to the longitudinal axis 3 (FIG. 3), the flow through the wall of the filter medium body 2 is realized radially from the exterior to the interior.

The filter element 1 and the filter medium body 2 comprise a longitudinally extending cross-sectional shape having elliptical cross-section which has radially oppositely positioned semicircular narrow sides relative to the longitudinal axis 3, the oppositely positioned semicircular narrow sides connected by oppositely positioned convexly or concavely curved longitudinal sides which together form the elliptical cross-section of the filter medium body. The narrow sides are at least approximately embodied semicircular; the longitudinal sides are slightly convexly curved outwardly. The the oppositely positioned semicircular narrow sides have a smaller radius than the oppositely positioned convexly or concavely curved longitudinal sides of the of filter medium body 2. The oppositely positioned semicircular narrow sides of the elliptical cross-section define a major axis 20, 21 connecting a center of a first one of the oppositely positioned semicircular narrow sides to a center of a second one of the oppositely positioned semicircular narrow sides. The length of the cross-sectional shape—length across everything from the exterior of a narrow side to the exterior of the oppositely positioned narrow side—is significantly larger than the width extending perpendicularly thereto and amounts to, for example, at least three times the width.

Across the axial height, the cross-sectional surface of the filter medium body 2 tapers. Accordingly, the upper end face of the filter medium body 2 has a larger cross-sectional surface than the lower end face with same cross-sectional shape. At each end face, an end disk 4 or 5 is provided which is in particular comprised of a sealing material and seals the filter medium body at the respective end face axially. The end disks 4 and 5 are, for example, glued to or cast onto the filter material of the filter medium body 2 and form in this way a fixed connection with the filter medium body 2.

The upper larger end disk 4 is embodied annular and covers only the end face of the filter medium body 2; an inwardly positioned free opening remains through which the interior enclosed by the filter medium body 2 is accessible. This makes it possible to introduce the unpurified raw air through the upper end disk 4 axially into the interior in the filter medium body 2.

The lower end disk 5, on the other hand, is embodied closed and seals the interior in the filter medium body 2 axially. Various support knobs 6, with which the filter element 1 is supported within a receiving filter housing of a filter device at the inner wall and at the bottom of the filter housing, are integrally formed at the outer rim and centrally at the lower smaller end disk 5.

Across the axial height, the cross-sectional surface of the filter medium body 2 tapers uniformly so that the filter medium body 2 has a conical shape. The width of the cross-sectional shape of the filter medium body 2 in the region of the upper larger end face is at least 25% larger than the width of the cross-sectional shape in the region of the lower smaller end face. The axial height of the filter medium body 2 is at least twice as large as the width of the cross-sectional shape of the filter medium body 2 in the region of the smaller end face.

The inner wall of the filter medium body 2 which delimits the interior is lined by a support grid 7 which imparts an increased stability to the filter medium body 2. The support grid 7 extends advantageously across the entire axial height and across the entire circumference at the inner side of the filter medium body 2.

As can be seen in FIG. 1 in connection with FIG. 2, the filter medium body 2 is twisted by twisting about its longitudinal axis 3 in such a way that the axially oppositely positioned end faces as well as end disks 4, 5 of the filter medium body 2 are angularly displaced relative to each other. The end disks 4 and 5 comprise in principle the same cross-sectional shape but, due to the conical tapering of the filter medium body 2, they have a differently sized cross-sectional surface. The twisting angle α, indicated in FIG. 1, has an angular range of at least 1° and maximally 20°.

Expediently, the twisting angle α is selected to be maximally so large that the outer contour of the smaller end disk 4, as illustrated in FIG. 1, is lying within the outer contour of the larger end disk 4, in the projection onto the larger end disk 4. In an alternative embodiment, it is however also possible that the twisting angle α is so large that the outer contour of the smaller end disk 5 in sections is lying outside of the outer contour of the larger end disk 4, in the projection onto the larger end disk 4.

The twisting of the filter medium body 2 is realized uniformly across its axial height. As an alternative thereto, it is also possible to provide a non-uniform twisting across the axial height of the filter medium body 2 so that, for example, different axial sections of the filter medium body 2 are embodied without or with a minimal twisting and further section with a larger twisting.

The support grid 7 which is arranged at the inner side of the filter medium body 2 comprises the same twist as the filter medium body 2. The support grid 7 in particular absorbs the twisting forces of the filter medium body 2 and holds and stabilizes the filter medium body 2 in the twisted state.

The manufacture of the twisted filter medium body 2 is realized, for example, in that the filter medium body 2 with the support grid 7 that is in a soft plastically deformable state is brought in the desired way into the twisted state by twisting about the longitudinal axis 3 and is fixed therein as long as it takes for the support grid 7 to harden and maintain the twisted state permanently.

What is claimed is:

1. A round filter element comprising:
    an annular filter medium body having a first end face and an axially opposite second end face and defines a longitudinal axis extending through an interior of the annular filter medium body from the first end face to the second end face, the annular filter medium body comprising:
    an annular wall of filter medium having an elliptical cross-section which has radially oppositely positioned semicircular narrow sides relative to the longitudinal axis, the oppositely positioned semicircular narrow sides connected by oppositely positioned convexly or concavely curved longitudinal sides which together form the elliptical cross-section of the annular wall of filter medium,
    wherein the oppositely positioned semicircular narrow sides have a smaller radius than the oppositely positioned convexly or concavely curved longitudinal sides of the annular wall of filter medium;
    wherein the oppositely positioned semicircular narrow sides of the elliptical cross-section define a major axis connecting a center of a first one of the oppositely positioned semicircular narrow sides to a center of a second one of the oppositely positioned semicircular narrow sides;
    wherein the annular wall of filter medium is configured to be flowed through by a fluid to be purified in a radial direction relative to the longitudinal axis of the filter medium body;
    wherein the elliptical cross-section extends in a direction transverse to the longitudinal axis of the filter medium body;
    wherein the first and second end faces are axially oppositely positioned relative to each other in an axial direction along the longitudinal axis of the filter medium body;
    a first end disk and a second end disk arranged at the first and second end faces, respectively, and comprising an identical cross-sectional shape;
    wherein the major axis of the elliptical cross-section of the annular wall of filter medium twists rotationally about the longitudinal axis from the first end face to the second end face, such that the major axis of the elliptical cross section taken at the at the first end face is rotated by a twist angle α relative to the major axis of the elliptical cross section taken at the at the second end face such that the axially oppositely positioned first and second end faces of the annular filter medium body are angularly displaced at the twist angle α about the longitudinal axis relative to each other;
    wherein the twist angle α is between 1 and 20 degrees about the longitudinal axis.

2. The filter element according to claim 1, wherein the twist angle α of the annular filter medium body about the longitudinal axis amounts to maximally 10 degrees.

3. The filter element according to claim 1, wherein the first and second end disks are parallel to each other.

4. The filter element according to claim 1, wherein a cross-sectional surface of the annular filter medium body tapers from the first end face toward the second end face and the second end face is smaller than the first end face.

5. The filter element according to claim 4, wherein the second end disk is smaller than the first end disk.

6. The filter element according to claim 5, wherein the twist angle α is selected such that an outer contour of the second end disk is positioned within an envelope of the first end disk when viewed in a direction of the longitudinal axis.

7. The filter element according to claim 5, wherein the second end disk is a closed end disk and the first end disk is an open end disk.

8. The filter element according to claim 4, wherein
a width of the elliptical cross-section of the annular filter medium body in a region of the first end face is larger by at least 25% than a width of the elliptical cross-section of the annular filter medium body in a region of the second end face.

9. The filter element according to claim 4, wherein
an axial height of the annular filter medium body is at least twice as large as a radial width along the major axis of the elliptical cross-section of the annular filter medium body in a region of the second end face.

10. The filter element according to claim 1, further comprising
a support grid arranged in the interior of the annular filter medium body and supporting the annular filter medium body.

11. The filter element according to claim 10, wherein
the support grid is arranged on an inner wall of the annular filter medium body.

12. The filter element according to claim 10, wherein
the support grid comprises the same twist angle $\alpha$ as the filter medium body.

13. The filter element according to claim 1, wherein
a length of the elliptical cross-section of the annular filter medium body along the major axis amounts to at least three times a width separating the oppositely positioned convexly or concavely curved longitudinal sides of the annular filter medium body.

14. A filter device comprising
a filter element according to claim 1 and
further comprising a filter housing configured to receive the filter element.

* * * * *